United States Patent [19]

Griffin et al.

[11] 4,239,018

[45] Dec. 16, 1980

[54] HEAT DETECTOR FOR LIVESTOCK

[76] Inventors: James E. Griffin, 11417 Maple Ave., Hebron, Ill. 60034; Wayne R. Ryden, 230 Lake Ave., Barrington, Ill. 60010

[21] Appl. No.: 974,368

[22] Filed: Dec. 29, 1978

[51] Int. Cl.³ ...................... A01K 11/00; A01K 29/00

[52] U.S. Cl. ...................................................... 119/1

[58] Field of Search .................... 119/1; 128/272, 232; 401/143; 222/94

[56] References Cited

U.S. PATENT DOCUMENTS

| | | | |
|---|---|---|---|
| 1,860,277 | 5/1932 | Dennis | 401/143 |
| 3,076,431 | 2/1963 | Rule et al. | 119/1 |
| 3,158,133 | 11/1964 | Larson | 119/1 |
| 3,163,163 | 12/1964 | Wilburn | 128/272 |
| 3,205,857 | 9/1965 | Larson | 119/1 |

*Primary Examiner*—Hugh R. Chamblee

[57] ABSTRACT

A pressure responsive delayed release standing heat detector for cows or other livestock comprises a small, single-use, flexible packet to be secured to the body of a cow in a position to be contacted by a mounting animal. A sponge-like body partially presaturated with a colored indicator fluid is contained within an air tight flexible plastic bulb or container having a stopper which is retained by friction and adapted to be expelled when the sponge is compressed under sustained pressure of a mounting animal. Expulsion of a stopper element and discharge of the indicator fluid leaves a telltale indication that the animal has been mounted.

10 Claims, 8 Drawing Figures

FIG. 6
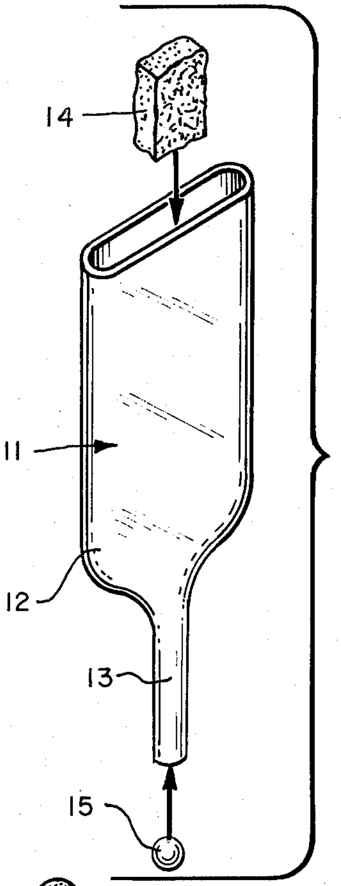
FIG. 8
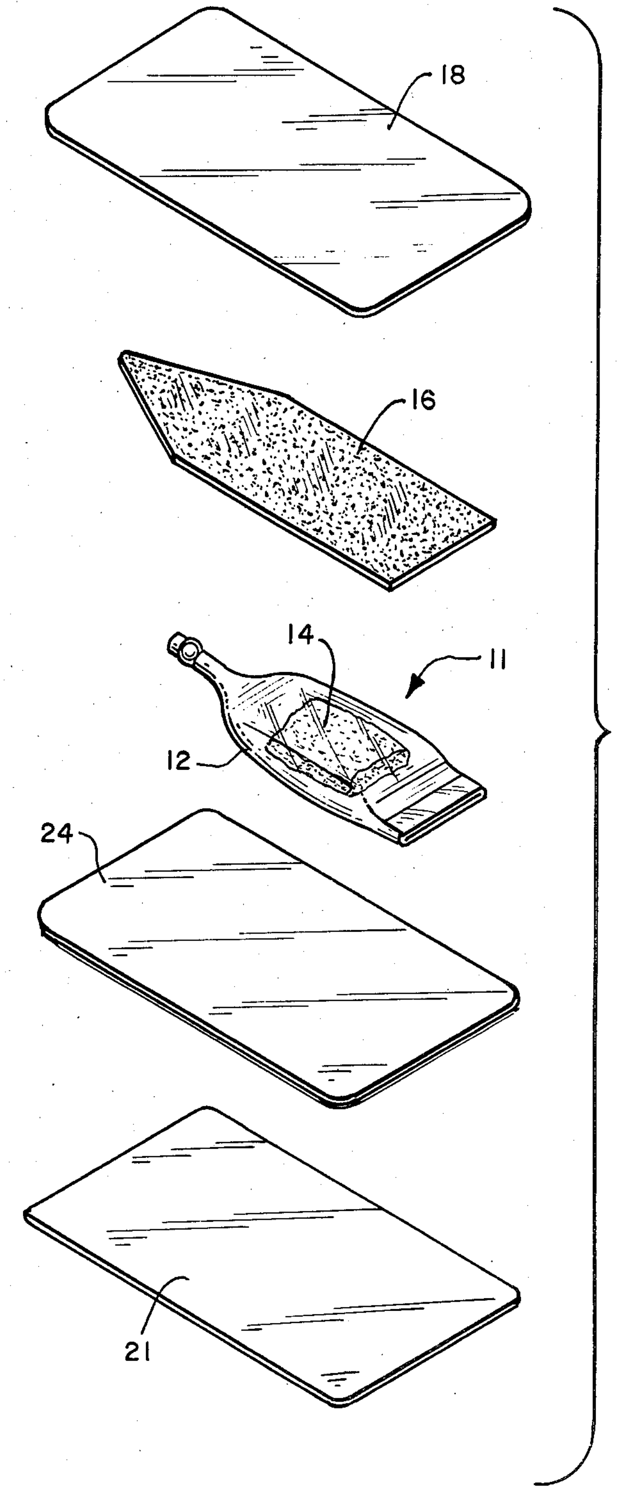
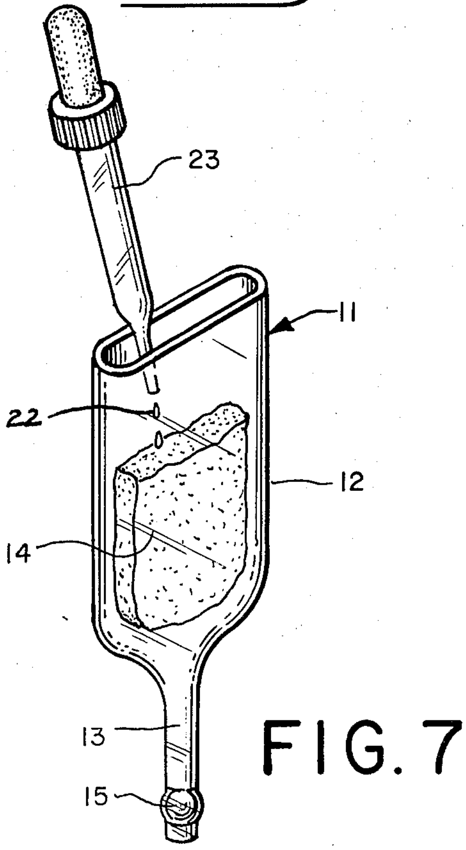
FIG. 7

HEAT DETECTOR FOR LIVESTOCK

BACKGROUND OF THE INVENTION

This invention relates to the field of animal husbandry and particularly to an improved device for determining when a cow or other animal is in estrus or heat.

Artificial insemination of livestock is being used on an ever increasing scale for selective breeding and to avoid the risks associated with releasing a bull within the herd. Breeding by artificial insemination requires that the semen be administered while the animal is in estrus. The heat cycle is of short duration—from 16 to 24 hours for cattle—and the optimum time for administration of the semen is approximately 12 hours after the onset of the heat cycle.

Various methods have been utilized to identify the onset of estrus in cattle. Most methods are dependent upon the natural homosexual tendencies of the female, manifested by the mounting of the animal in heat by one or more other females. Visual inspection and observation of the herd may of course be employed to identify and segregate females in standing heat, but because of the short duration of the heat cycle, such visual observation must be conducted at least twice daily and accompanied by immediate segregation or marking of the animals to be inseminated. Also, unless the herd is maintained under constant visual observation, the heat cycle may go undetected in many animals. In the dairy industry especially, this failure may be costly, resulting in the loss of at least three weeks milk production amounting to as much as a thousand pounds or more. Optimum ranching practice requires mass breeding of the herd annually so that the animals mature and are ready for market at a common time; visual observation of the herd, which is often widely dispersed, is obviously inefficient.

Various devices and systems have been used or described for improving the efficiency of detection of estrus in bovine herds. U.S. Pat. No. 3,297,020 describes the use of a vaginally inserted electric probe for detecting accelerated mucous secretion accompanying the onset of heat. U.S. Pat. No. 3,844,273 discloses an electronic system comprising radio transmitters individually mounted on the females with switches activated by the mounting animal. U.S. Pat. No. 3,948,249 describes an infra-red temperature detection system for scanning the rump of the female to detect excess warmth caused from repeated mountings. All of these systems are obviously cumbersome at best and require significant capital investment for equipment.

The most successful and widely used type of standing heat detector, of which various forms have been described and used, is a passive device which is glued to the sacrum of the cow in a position to be activated by pressure from the brisket of the mounting animal. Such devices include a reservoir of marker fluid which is discharged in response to pressure to provide a readily observable stain or marking in response to mounting. Such devices are described for example in U.S. Pat. Nos. 3,076,431, 3,158,133, 3,158,134, 3,205,857 and 3,942,475.

Typically, passive standing heat detectors known and used in the art include a reservoir of marker fluid which is compressed by the mounting pressure to discharge some or all of the fluid and provide a telltale marking. The discharge passageway is constricted, or a check valve system provided, to make the device less susceptible to false triggering by a rejected mount or incidental rubbing or brushing of the rump against a tree or barnyard structure. However, the most widely used device (e.g. U.S. Pat. No. 3,075,431) has been found to have inadequate shelf life because of incidental seepage of the marker fluid, while other devices (e.g. U.S. Pat. Nos. 3,158,133, 3,158,134, 3,205,857 and 3,942,475) are undesirably complex and expensive.

OBJECTS OF THE INVENTION

It is an object of the invention to provide a new and improved pressure responsive delayed release standing heat detector for cows or other species of livestock which avoids one or more of the disadvantages of the prior art devices and systems.

It is a more particular object of the invention to provide a new and improved pressure responsive delayed release single-use standing heat detector of the passive type exemplified by the above-identified prior art patents.

A specific object of this invention is to provide a pressure responsive delayed release standing heat detector for cows, which is simple and inexpensive and which exhibits greatly improved shelf life.

Yet another object of the invention is to provide a new and improved pressure responsive delayed release standing heat detector for cows, which is less susceptible to false triggering then prior devices of the passive type.

A further object of the invention is to provide a new and improved pressure responsive delayed standing heat detector for cows, in which the time duration of sustained pressure required to trigger the device may be readily controlled in the manufacture of the device.

SUMMARY OF THE INVENTION

In accordance with the invention, a new and improved pressure responsive delayed release standing heat detector for cows, of the type adapted to be secured to the body of a cow in a position to be contacted by a mounting animal, comprises a hollow flexible container having a reservoir portion communicating with a tubular neck portion. A body of sponge-like material is enclosed in the reservoir portion and at least partially saturated with a colored indicator fluid. A stopper element is retained by friction in the tubular neck portion of the container for preventing seepage of the fluid from the container, but is adapted to be expelled in response to sustained pressure from a mounting animal. Preferably, an element of absorbent material is provided, overlying at least the outer end of the tubular portion of the container for receiving fluid from the container when the sponge-like body is compressed and the stopper element is expelled. The assembly is preferably contained within a substantially sealed packet having a transparent portion overlying the absorbent element, and the face of the packet opposite the transparent portion is precoated with a pressure responsive adhesive for securing the packet to the body of the cow. The preferred construction also includes a peelable protective over the adhesive for permitting storage and handling of the packet prior to application to the cow.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 6 is an exploded perspective view of a portion of the device of FIG. 1, illustrating the manner of its assembly;

FIG. 7 is a perspective view illustrating an intermediate step in the process of manufacturing the device of FIG. 1; and FIG. 8 is an exploded perspective view illustrating the final manufacturing steps for the device of FIG. 1.

DESCRIPTION OF THE PREFERRED EMBODIMENT

Figure 1:
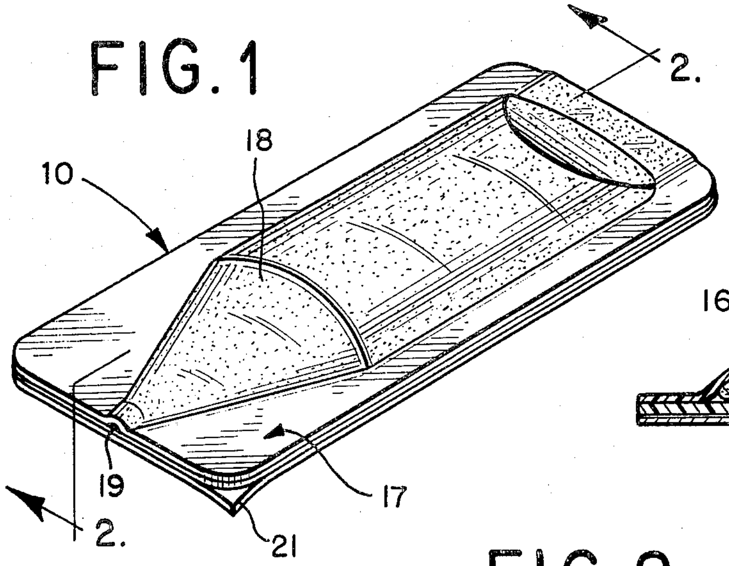
FIG. 1 is a perspective view of a preferred construction of a pressure responsive delayed release standing heat detector embodying the invention.
Figure 3:
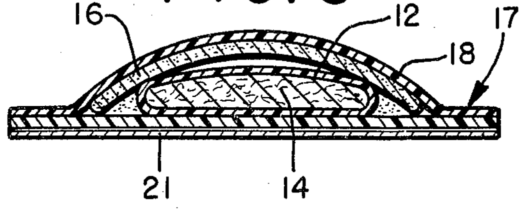
FIG. 3 is a cross-sectional view taken along the line 3—3 of FIG. 2.
Figure 2:
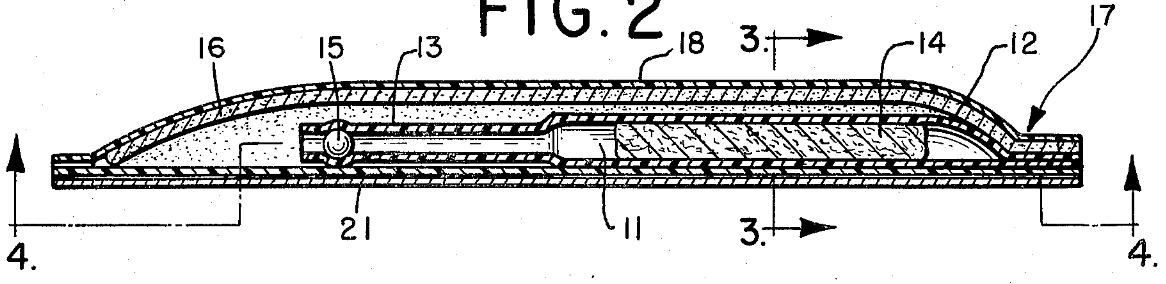
FIG. 2 is a cross-sectional view of the device of FIG. 1, taken along the line 2—2 of FIG. 1.
Figure 4:
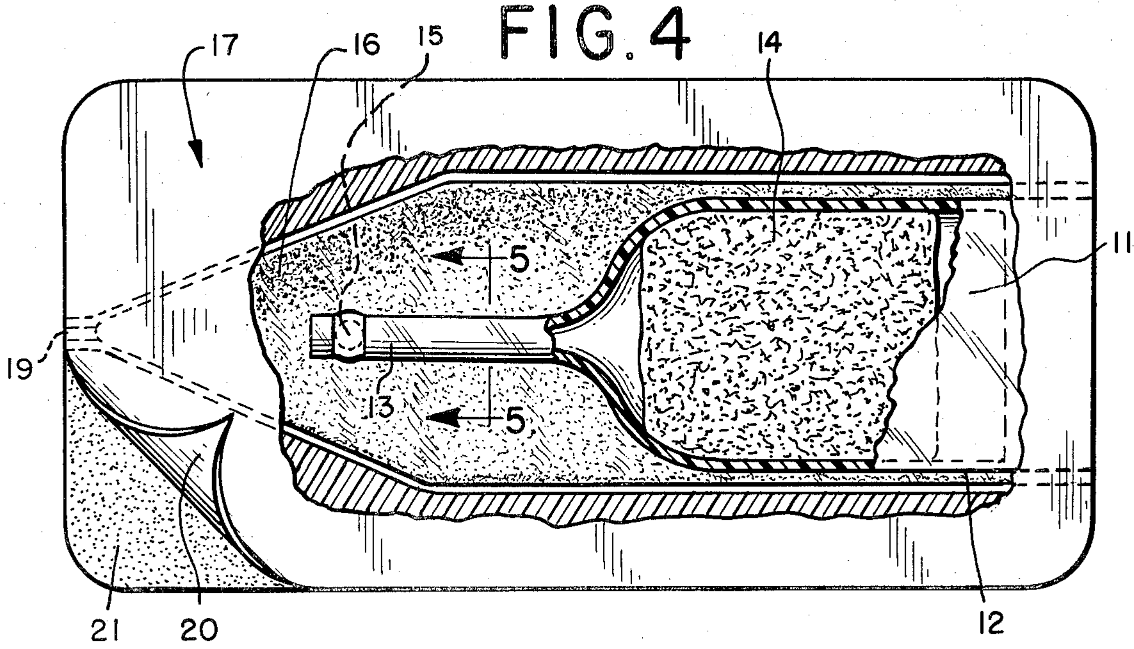
FIG. 4 is a partial cross-sectional view taken along the line 4—4 of FIG. 2.
Figure 5:
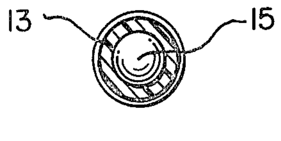
FIG. 5 is a cross-sectional view taken along the line 5—5 of FIG. 4.

The preferred embodiment of the invention as shown in FIGS. 1-5 is a single-use passive device adapted to be secured to the body of a cow in a position to be contacted by a mounting animal. The preferred locations of the animals body include the dorsal, flank, rump, and tailbone areas, or the sacrum. It has been found that best results are achieved when the device is secured to the sacrum area. Sustained direct pressure from the brisket, legs, chin or jaw of the mounting animal activates the device.

The device includes a hollow flexible container 11, preferably of a flexible plastic material such as polyethylene or polypropylene, having a reservoir portion 12 which communicates with a tubular neck portion 13. A body 14 of sponge-like material, preferably a synthetic cellulose sponge material, is enclosed in reservoir portion 12 and is at least partially saturated with a colored indicator fluid which may be a vegetable dye or an aniline dye preferably added to a low-freezing point material such as ethylene glycol for optimum shelf life and reliability under various climate conditions. The stopper element, which may be of other materials (e.g. plastic) or configurations, is shown as a metal ball 15, which is force-inserted and retained by friction within the open end of neck portion 13 to seal the container and prevent seepage of the indicator fluid. An element of absorbent material, preferably a single layer of porous paper 16, overlies at least the outer end of the tubular neck portion 13 and preferably extends for substantially the full length of the device to provide an extended surface area. Container 11 and absorbent element 16 are enclosed within a substantially sealed packet 17 which is also formed of flexible, preferably plastic, material and has a window or transparent portion 18 overlying absorbent element 16. A small vent 19 is provided to prevent trapping of air under pressure during the plastic sealing operations in the assembly of the device. The back side of packet 17 (that opposite transparent window 18) is precoated with a pressure responsive adhesive 20, preferably a non-water-soluble rubber cement. Finally, a peelable protective element 21 is provided over the adhesive layer 20 for permitting storage and handling of the packet prior to application to the cow.

In use, the device is secured to an appropriate location on the cow's body, preferably the sacrum, by the simply expedient of peeling protective element 21 to expose adhesive layer 20 which is then directly applied to the selected location. When the cow is mounted by another animal, sustained pressure from the mounting animal's brisket compresses the packet, including sponge 14, forcing the marking fluid from the sponge and building up pressure against stopper element 15 until the fluid pressure and lubrication from the fluid causes the surrounding area from the tubular neck to expand slightly and the stopper element is expelled. Continued pressure causes the fluid to discharge onto the absorbent element 16 which because of its porous or absorbent nature, results in a stain over an extended area around the outer end of the tubular neck 13 to provide a readily observable permanent indication that the cow has been mounted.

The mounting time required to trigger the device is determined by the level of saturation of sponge 14 by the indicator fluid; the less saturated the sponge 14, the longer the duration of sustained pressure which is required to expel the stopper element 15 and discharge the fluid. When the cow is not in heat, its natural instinct is to reject attempted mountings by other animals, and to avoid triggering by such false mounts it is preferred to only partially saturate sponge 14 so that mounting pressures less than at least 3 to 5 seconds will not activate the device. The optimum amount of indicator fluid is of course dependent upon the volume and absorbency characteristics of sponge 14 and may readily be determined empirically.

The inclusion of sponge 14 also provides substantial protection against false triggering in response to casual sharp impact in handling or after application to the body of the animal, by absorbing much of the force of such impact and preventing rapid build-up of fluid pressure within the bulb.

During storage and handling of the device prior to application to the cow, and while secured to the cow before sustained mounting, the fluid container remains sealed by stopper 15 to prevent any seepage or leakage of the indicator fluid, thus providing virtually indefinite shelf-life and greatly enhanced reliability. The provision of precoated adhesive layer 20 and peelable protective element 21 provides for optimum ease of application of the device to the animal without the necessity of a separate manual application of glue or other adhesive as with prior devices.

The manufacture of the device of the invention is a very simply series of operations requiring only inexpensive conventional techniques and equipment and is illustrated in FIGS. 6-8. Container 11 may be formed by conventional molding processes from suitable materials such as polyethylene or polypropylene materials in the neck 13 of which stopper element 15, which may be a simply metal ball bearing element, has been previously force-inserted as indicated in FIG. 6. Blow molding and injection molding processes and equipment which are suitable for forming such bulbs are well known. The molded bulb is left unsealed at its large end to permit sponge-like body 14 to be inserted. Preferably at the time of insertion, sponge-like body 14 is in the form of a dry compressed capsule or pill of a much smaller volume in the dry state than the internal volume of reservoir portion 12. A measured amount of colored indicator fluid 22 is inserted in reservoir portion 12 through the open large end, as indicated schematically by the showing of a medicine dropper 23 in FIG. 7, although in commercial practice automatic metering equipment would be employed. Typically the amount of indicator fluid is small, as for Example 1 to 1½ cubic centimenters. The fluid 22 is absorbed by the sponge capsule which expands to occupy at least the major portion of the internal volume of the reservoir 12. The open large end of the container is then heat sealed to form an air tight unit, preventing evaporation or leakage of the indicator fluid.

The completed bulb 11 is then assembled with absorbent layer 16 in a packet formed of transparent flexible plastic element 18 and plastic backing layer 24 as shown in the perspective view of FIG. 8, and window element 18 and backing layer 24 are peripherally heat sealed together to constitute an enclosing packet. The underside of layer 24 is then precoated with adhesive layer 20, and peelable protective element 21 is applied.

Variations of the construction are readily apparent. For example, a plastic plug or stopper may be employed instead of metal ball 15 as the stopper element. A zipper pouch of liquid or semi-solid adhesive may be used instead of precoated adhesive layer 20 and peelable protective element 21 or, for economy if one wishes to forego the convenience of the self contained adhesive feature, the adhesive provision may be omitted entirely. Such details of construction and manufacture however, are not of the essence of the invention. Of course, the device of the invention may also be used to detect estrus in other species of domestic animals.

Thus the invention has provided a new and improved pressure responsive delayed release standing heat detector for cows which is extremely simple and inexpensive to construct and which provides virtually unlimited shelf-life and greatly enhanced reliability as compared with prior devices. As a highly desirable optional feature, the device has a self-contained adhesive to facilitate application to the animals to be monitored. Moreover, the specific time delay for activation of the device is readily controllable by the simple expendient of varying the amount of indicator fluid.

What is claimed is:

1. A pressure responsive delayed release standing heat detector for domestic animals, of the type adapted to be secured to the body of said animal in a position to be contacted by a mounting animal, comprising:

a hollow flexible container having a reservoir portion communicating with a tubular neck portion;

a body of sponge-like material enclosed in said reservoir portion and at least partially saturated with a colored indicator fluid; and means for preventing seepage of fluid from said container and being adapted to be released in response to sustained pressure from a mounting animal on the flexible container and indicator fluid being expelled from said sponge-like material.

2. A pressure responsive delayed release standing heat detector for domestic animals, of the type adapted to be secured to said animal in a position to be contacted by a mounting animal, comprising:

a hollow flexible container having a reservoir portion communicating with a tubular neck portion;

a body of sponge-like material enclosed in said reservoir portion and at least partially saturated with a colored indicator fluid;

and a stopper element retained in said tubular neck portion for preventing seepage of fluid from said container but adapted to be expelled by fluid expelled from said sponge-like material in response to sustained pressure from a mounting animal.

3. A pressure responsive delayed release standing heat detector for domestic animals, of the type adapted to be secured to the body of said animal in a position to be contacted by a mounting animal, comprising:

a hollow flexible plastic container having a reservoir portion communicating with a tubular neck portion;

a body of sponge-like material enclosed in said reservoir portion and partially saturated to a predetermined level of saturation with a colored indicator fluid;

a stopper element retained by friction in said tubular neck portion for preventing seepage of fluid from said container but adapted to be expelled in response to sustained pressure from a mounting animal, said level of partial saturation of said body of sponge-like material with said colored indicator fluid being preselected to require sustained pressure from at least three to five seconds to effect expulsion of said stopper element and discharge of indicator fluid through said tubular neck portion;

and an element of absorbent material overlying at least the outer end of said tubular portion of said container and having an extended surface area for receiving and spreading fluid from said container when discharged from said tubular neck portion.

4. A standing heat detector according to claim 3, in which said indicator fluid comprises a low-freezing point material such as ethylene glycol.

5. A standing heat detector according to claim 3, in which said absorbent element is a layer of porous paper having an extended surface area to permit spreading of said indicator fluid upon discharge from said tubular neck portion of said container.

6. A standing heat indicator according to claim 3, in which said container is formed of flexible plastic material.

7. A standing heat detector according to claim 3, in which said body of sponge-like material is of synthetic sponge cellulose.

8. A standing heat detector according to claim 3, in which the level of saturation of said body of sponge-like material with said colored indicator fluid determines the time duration of sustained pressure required to expel said stopper element and release indicator fluid for providing an indication of standing heat.

9. A pressure responsive delayed release standing heat detector for domestic animals, of the type adapted to be secured to the body of said animal in a position to be contacted by a mounting animal, comprising:

a hollow flexible container having a reservoir portion communicating with a tubular neck portion;

a body of sponge-like material enclosed in said reservoir portion and at least partially saturated with a colored indicator fluid;

a stopper element retained by friction in said tubular neck portion for preventing seepage of said fluid from said container but adapted to be expelled in response to sustained pressure from a mounting animal;

an element of absorbent material overlying at least the outer end of said tubular portion of said container for receiving fluid from said container when said sponge-like body is compressed and said stopper element is expelled;

a substantially sealed packet for said container and said absorbent element having a transparent portion overlying said absorbent element; and an adhesive on the face of said packet opposite said transparent portion for securing said packet to the body of the subject animal.

10. A pressure responsive delayed release standing heat detector for domestic animals, of the type adapted to be secured to the body of said animal to be contacted by a mounting animal, comprising:

a hollow flexible container having a reservoir portion communicating with a tubular neck portion;

a body of sponge-like material enclosed in said reservoir portion and at least partially saturated with a colored indicator fluid;

a stopper element retained by friction in said tubular neck portion for preventing seepage of said fluid from said container but adapted to be expelled in response to sustained pressure from a mounting animal;

an element of absorbent material overlying at least the outer end of said tubular portion of said container for receiving fluid from said container when said sponge-like body is compressed and said stopper element is expelled;

a substantially sealed packet for said container and said absorbent element having a transparent portion overlying said absorbent element;

a pressure responsive adhesive on the face of said packet opposite said transparent portion for securing said packet to the body of the subject animal; and a peelable protective element over said adhesive for permitting handling and storage of said packet prior to application to the subject animal.

* * * * *